Dec. 19, 1939.  J. C. JOHNSON  2,184,219
HYDRAULIC TRANSMISSION
Filed Feb. 11, 1938  3 Sheets-Sheet 3
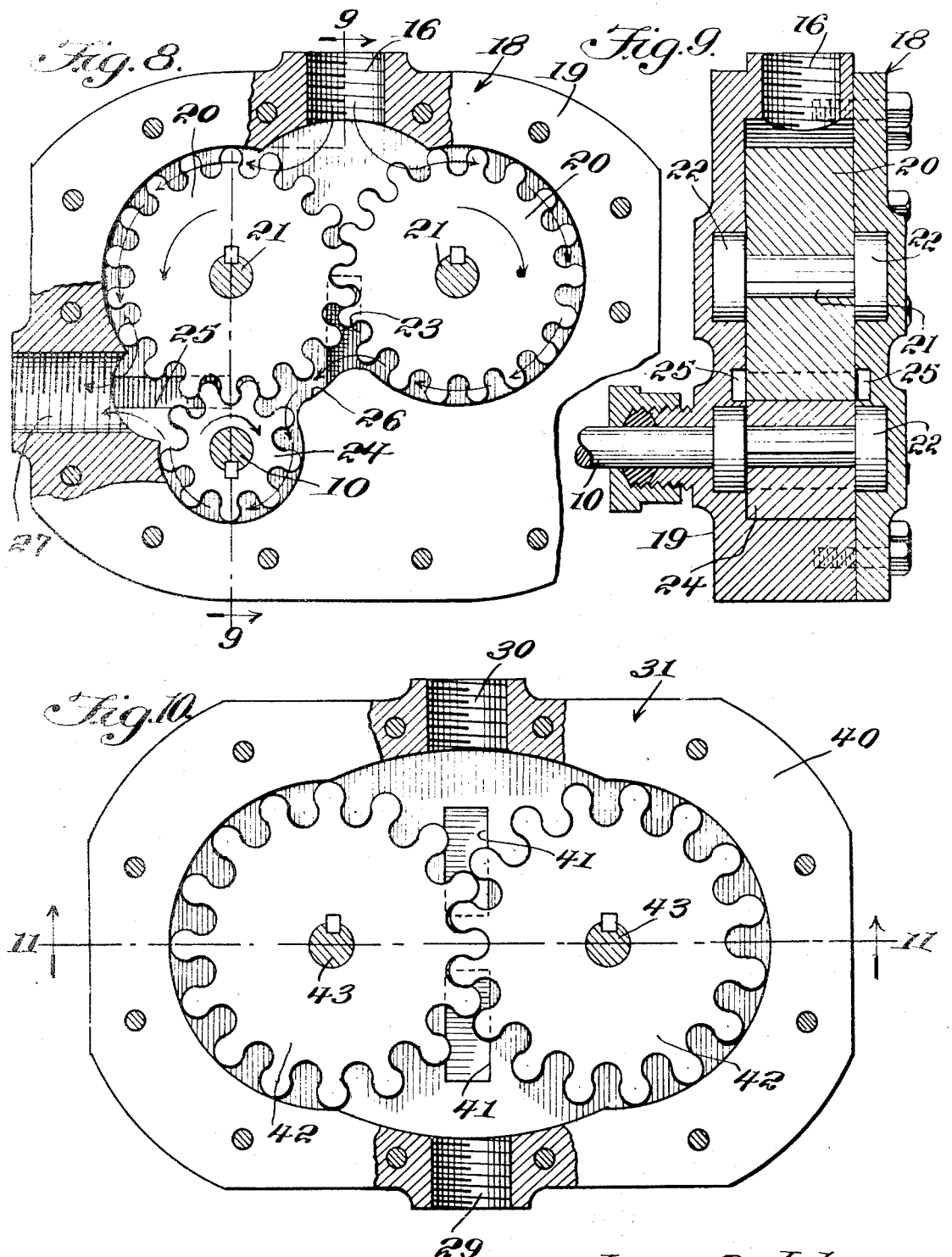
Jesse C. Johnson
INVENTOR
BY Victor J. Evans & Co.
ATTORNEYS Patented Dec. 19, 1939

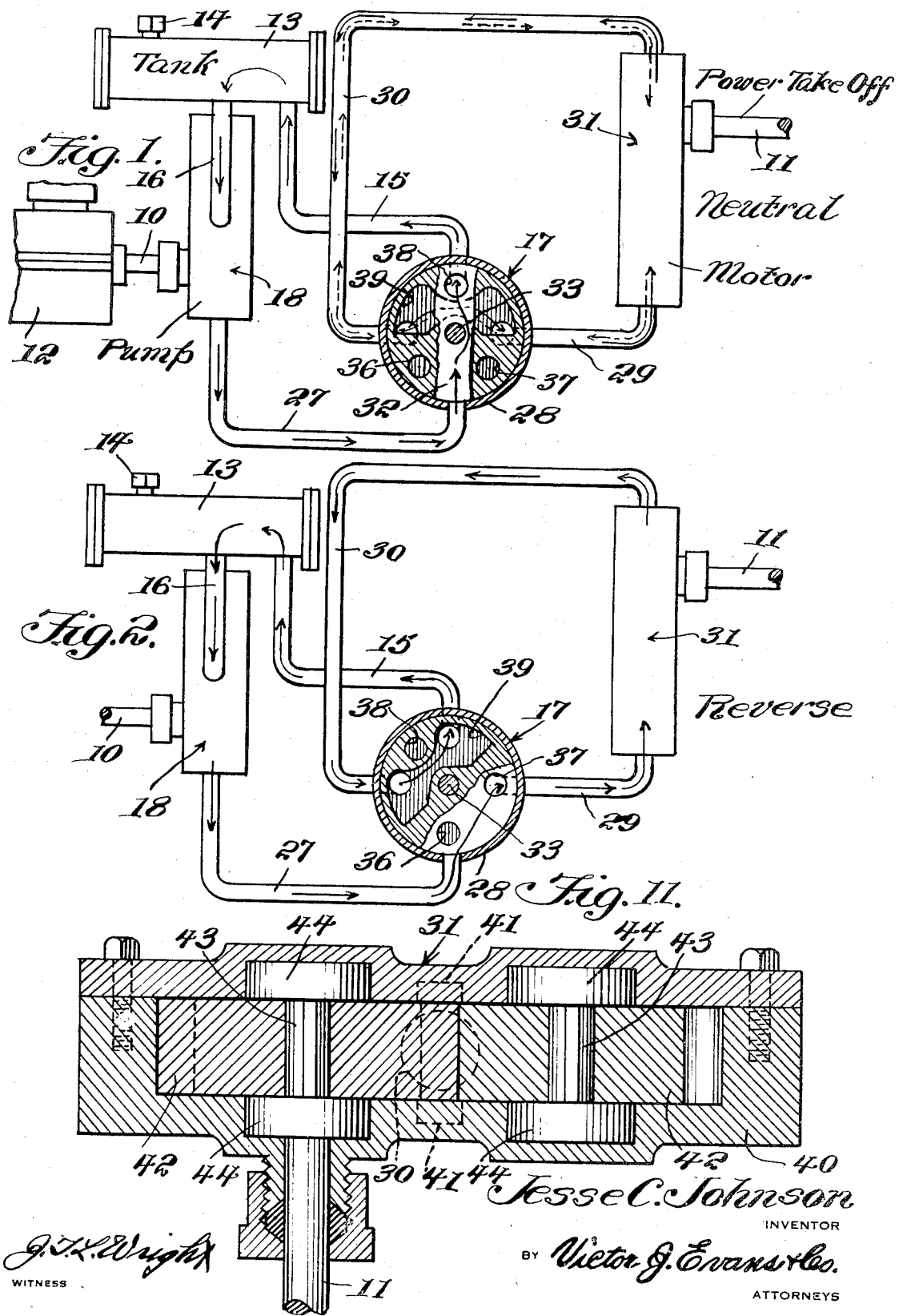

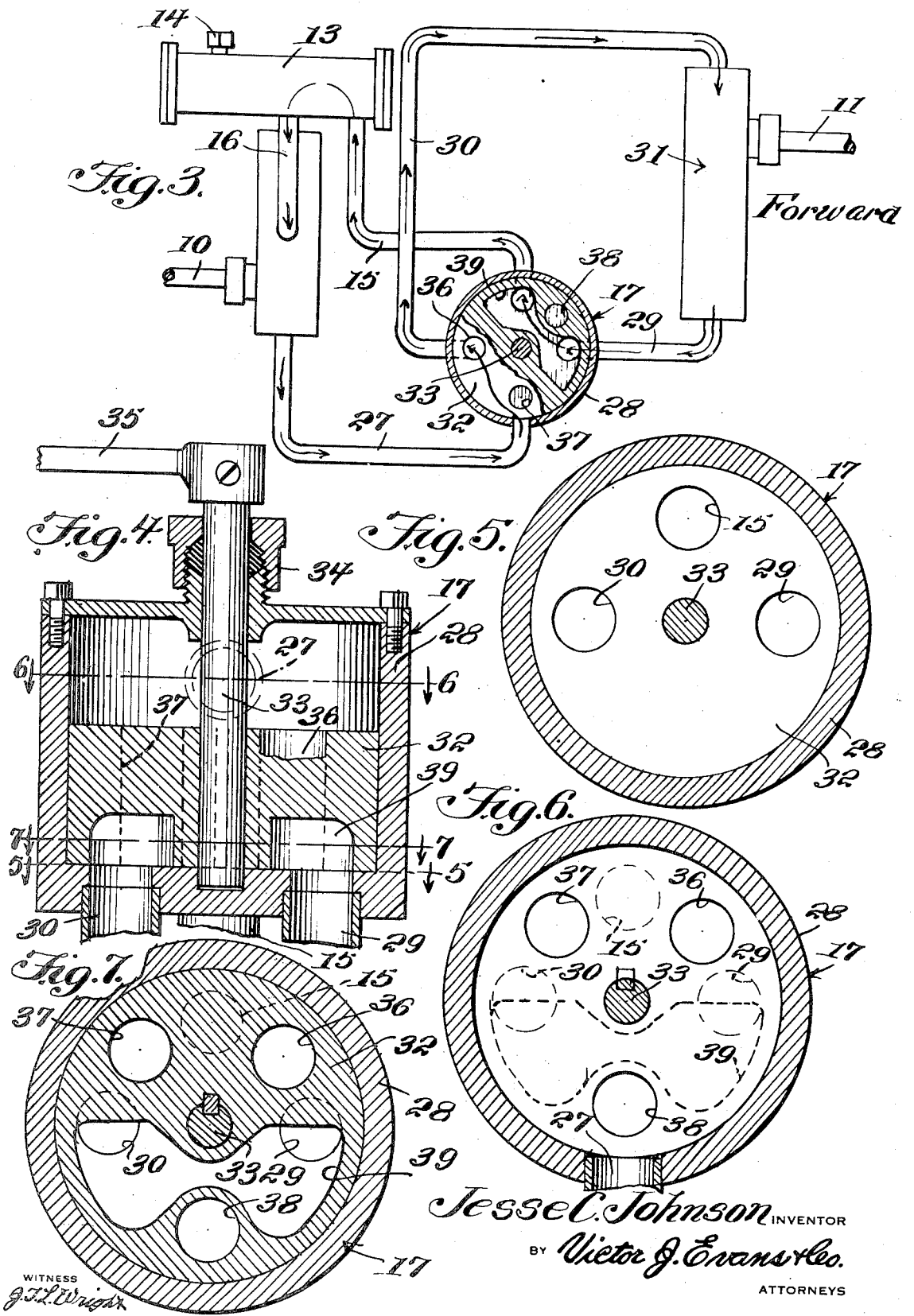

2,184,219

UNITED STATES PATENT OFFICE 2,184,219

HYDRAULIC TRANSMISSION

Jesse C. Johnson, Delray Beach, Fla.

Application February 11, 1938, Serial No. 190,124

1 Claim. (Cl. 60—53)

This invention relates to a hydraulic transmission and has for an object to provide apparatus interposed between a power driven shaft and a power take off shaft, adapted to promote extreme flexibility in speed control both in forward and in reverse direction.

A further object is to provide in apparatus of this type a novel control valve having ports so arranged as to control the direction of circulation of oil through the motor and also to permit the motor to coast as in free wheeling when desired, said ports being adapted to permit of reversing the direction of oil flow gradually and without the usual shocks and jars experienced in conventional reversing mechanism.

A further object is to provide apparatus of this type which will be formed of a few strong simple and durable parts, which will be inexpensive to manufacture and which will not easily get out of order.

With the above and other objects in view the invention consists of certain novel details of construction and combinations of parts hereinafter fully described and claimed, it being understood that various modifications may be resorted to within the scope of the appended claim without departing from the spirit or sacrificing any of the advantages of the invention.

In the accompanying drawings forming part of this specification,

Figure 1 is a diagrammatic view of a hydraulic transmission constructed in accordance with the invention, the control valve being shown in neutral position.

Figure 2 is a diagrammatic view similar to Figure 1 but showing the control valve in reverse position.

Figure 3 is a diagrammatic view similar to Figure 1 but showing the control valve in forward position.

Figure 4 is a longitudinal sectional view of the control valve.

Figure 5 is a cross sectional view of the valve taken on the line 5—5 of Figure 4 and showing three ports in the valve casing.

Figure 6 is a cross sectional view taken on the line 6—6 of Figure 4 and showing three ports and by-pass in the valve body.

Figure 7 is a cross sectional view taken on the line 7—7 of Figure 4 and showing the ports and the bypass in the valve body.

Figure 8 is a side elevation of the pump with one of the side plates removed to expose the gears and pinion.

Figure 9 is a cross sectional view taken on the line 9—9 of Figure 8 showing the recess in the side plates for releasing oil pressure between meshing gear teeth of the pump.

Figure 10 is a side elevation of the motor with one of the side plates removed to expose the gears and the recess for relieving pressure between meshing teeth.

Figure 11 is a cross sectional view of the motor taken on the line 11—11 of Figure 10.

Referring now to the drawings in which like characters of reference designate similar parts in the various views, 10 designates a power driven shaft and 11 designates a power take off shaft, and for the purpose of illustrating a concrete example of one use to which the hydraulic transmission may be put, the driven shaft is illustrated as being the shaft of an automobile engine 12 while the power take off shaft is the propeller shaft of an automobile. However, the use of the device is intended to include hydraulic power transmission for lathes, water and air craft, vehicles and other machinery.

In carrying out the invention a tank 13 is provided the same being air and leak-tight and being provided with a filling tube 14 through the medium of which the tank may be filled with oil or other fluid medium. The tank is provided with two pipes 15 and 16 the former being connected to a control valve 17 and the latter being connected to a pump 18 of the gear type, best shown in Figure 8.

The pump comprises a housing 19 in which a pair of gears 20 are fixed to shafts 21 which are mounted in bearings 22, as best shown in Figure 9. The teeth of the gears mesh at a point midway between the shafts 21 and to prevent packing of the oil between the meshing teeth oppositely disposed recesses 23 are formed in the pump housing opposite the meshing teeth to relieve oil pressure between the contacting surfaces of the teeth.

The pump gears 20 are driven by a pinion 24 which meshes with one of the gears and is fixed to the driven shaft 10 of the motor. For relieving oil pressure at the contacting surfaces of the meshing teeth of the pinion and pump gear, recesses 25 are formed in the pump housing opposite the meshing teeth. The course of oil flow through the pump is indicated by arrowheads in Figure 8 and it will be observed that the housing is provided with a passage 26 of greater radius than the curvature of the inner surfaces against which the gears form pockets to carry the oil around, this passage being located between the pump gears and the pinion and communicating with the first named recesses 23 so that unobstructed oil flow through the pump will be effected. In practice it has been found that the use of the driving pinion 24, instead of employing one of the pump gears as a driver, materially decreases the power consumption to operate the pump at a predetermined capacity.

The pump forces the oil through a pipe 27 to the beforementioned control valve 17 which will now be described.

As best shown in Figures 4 to 7 inclusive the control valve comprises a casing 28 having three pipes entering the bottom, two of the pipes, namely the pipe 29 and the pipe 30 being connected to a motor 31 of the gear type, later described, and the third pipe being the beforementioned pipe 15 which communicates with the oil tank 13. The outlet pipe 27 of the pump enters the casing near the top thereof and above the valve body 32.

The valve body is provided with a stem 33 which projects through a stuffing box 34 on the casing and is equipped with a handle 35 by means of which the valve may be turned to its three positions, neutral, forward and reverse.

The valve body is provided with three ports 36, 37 and 38, best shown in Figure 7, disposed parallel with the valve stem and opening through the top and bottom faces of the body. Also the valve body is provided with a by-pass 39 for selectively cross connecting the pipes 15, 29 and 30 leading to the motor 31 and pump 18 for reversing the direction of flow to the motor as shown in Figures 2 and 3, or to form a closed circuit through the motor pipes 30 and 29, as shown in Figure 1 and permit free wheeling when the valve is in neutral position as will be later described.

The valve body 32 is about one-half the height of the valve casing so that a considerable space exists above the valve body in the casing through which oil may flow from the discharge pipe 27 of the pump to the ports 36, 37 and 38 of the valve body.

As best shown in Figures 10 and 11 the housing 40 of the gear motor 31 is provided with oppositely disposed recesses 41 which release oil pressure from between the meshing teeth of the gears 42, the recesses being located between the shafts 43 of the gears which shafts are mounted in bearings 44, the shaft of one of the gears being connected to the power take off shaft 11, previously described. The pipes 29 and 30 enter the top and bottom of the housing in alignment with the meshing teeth of the gears and the flow of oil may be in either direction according to the setting of the control valve body 32.

In operation, the system being filled with oil, the valve body 32 may be set in forward position, as best shown in Figure 3. In this position of the valve the pump will withdraw oil from the tank 13 through the pipe 16, and discharge the oil through the pipe 27 over the top of the valve body 32 and through the port 36 and pipe 30 to drive the motor 31. Oil flows from the motor through the pipe 29, by-pass 39 and pipe 15 to the tank 13. By virtue of the tank being air tight and leak-tight there will be high oil pressure on one side of the motor and low oil pressure on the opposite side created by the pump 18 so that high efficiency with economy in power consumption to drive the motor is promoted.

To reverse the direction of oil flow to the motor the valve body 32 is set as shown in Figure 2. The direction of flow is then from the tank 13 through the pipe 16 to the pump and from the pump through the pipe 27 over the top of the valve body to the port 37 to the pipe 29 through the gear motor 31 and return from the motor through the pipe 30, by-pass 39 and pipe 15 to the tank 13.

In the neutral position of the valve body 32, shown in Figure 1, the oil from the pump will flow in a closed circuit through the pipe 27 over the top of the valve body 32 through the port 38 and pipe 15 to the tank and simultaneously oil will flow in a closed circuit through the gear motor, in either direction, according to the direction of movement of the shaft 11 in the case of the same being driven by an automobile ground wheel, the circuit including the pipes 29 and 30 and by-pass 39 in the valve body.

From the above description it is thought that the construction and operation of the invention will be fully understood without further explanation.

What is claimed is:

In a hydraulic transmission, a control valve comprising a casing having three pipes entering the bottom, a pipe entering the casing near the top thereof, a valve body in the casing below the last named pipe, the valve body being provided with a stem which projects from the casing, and a handle on the stem for controlling the valve body, there being three ports in the valve body disposed parallel with the axis of the stem and opening through the top and bottom faces of the body and adapted to be selectively brought into registration with the first named pipes, the body also being provided with a by-pass for selectively connecting two of the first named pipes, the valve body being of substantially less height than the height of the casing to provide a space above the valve body to which fluid medium may flow from the pipe in the top of the casing to the open upper ends of the three ports in the valve body.

JESSE C. JOHNSON.